US012623885B2

(12) United States Patent
Alkan

(10) Patent No.: US 12,623,885 B2
(45) Date of Patent: May 12, 2026

(54) ELEVATOR POSITION MEASUREMENT SYSTEM

(71) Applicant: Otis Elevator Company, Farmington, CT (US)

(72) Inventor: Ergün Alkan, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 868 days.

(21) Appl. No.: 17/974,827

(22) Filed: Oct. 27, 2022

(65) Prior Publication Data

US 2023/0278827 A1 Sep. 7, 2023

(30) Foreign Application Priority Data

Mar. 2, 2022 (EP) .................................... 22159813

(51) Int. Cl.
*B66B 1/34* (2006.01)
*B66B 3/02* (2006.01)

(52) U.S. Cl.
CPC ............ *B66B 1/3492* (2013.01); *B66B 3/023* (2013.01)

(58) Field of Classification Search
CPC ......... G01B 7/003; B66B 7/064; B66B 3/023; B66B 3/02; B66B 5/0006; B66B 1/3492
USPC .......................................................... 187/394
See application file for complete search history.

(56) References Cited

U.S. PATENT DOCUMENTS

| | | | | |
|---|---|---|---|---|
| 2006/0243537 A1* | 11/2006 | Finn | ...................... | B66B 1/3492 187/394 |
| 2019/0071282 A1* | 3/2019 | Zapf | ..................... | B66B 7/1215 |
| 2020/0189879 A1* | 6/2020 | Gentile | ................... | B66B 5/005 |
| 2022/0315385 A1* | 10/2022 | Martin | ................. | B66B 7/1238 |

FOREIGN PATENT DOCUMENTS

EP 3587329 A1 1/2020

OTHER PUBLICATIONS

Liu (CN 112162030 A) Wire Rope Online Monitoring Method, System, Electronic Device And Storage Medium (Year: 2021).*
Hasabe (JP 2021067487) Measurement Device, Cable Taking-Up Device, and Measurement Method (Year: 2021).*
European Search Report for application EP 22159813.9. dated Aug. 8, 2022, 40 pages.

* cited by examiner

*Primary Examiner* — Jorge L Carrasquillo
(74) *Attorney, Agent, or Firm* — CANTOR COLBURN LLP

(57) ABSTRACT

An elevator system includes an elevator car, an elongate tension member operably connected to the elevator car and configured to move the elevator car, and an elevator car position measurement system. The elevator car position measurement system includes a pulse generator configured to transmit a pulse along the elongate tension member; and a detector unit configured to receive the pulse from the pulse generator after the pulse has been transmitted along a length of the elongate tension member and to record a time at which the pulse is received. One of the pulse generator and the detector unit is arranged to move within the hoistway dependent on a position of the elevator car within the hoistway, such that a length of the elongate tension member along which the pulse is transmitted changes dependent on a position of the elevator car within the hoistway.

14 Claims, 10 Drawing Sheets

ELEVATOR POSITION MEASUREMENT SYSTEM

FOREIGN PRIORITY

This application claims priority to European Patent Application No. 22159813.9, filed Mar. 2, 2022, and all the benefits accruing therefrom under 35 U.S.C. § 119, the contents of which in its entirety are herein incorporated by reference.

TECHNICAL FIELD

This disclosure relates to an elevator position measurement system, which determines the position of an elevator car within an elevator hoistway and a method of measuring a position of an elevator car within a hoistway of an elevator system.

BACKGROUND

It is known to provide an elevator hoistway with a length of tape, arranged to extend vertically in the hoistway, and fixedly fastened to the hoistway wall. The elevator car includes a sensor e.g. a camera, able to sense certain features e.g. incremental markings, along the length of the tape, and the sensed features are used to determine the position of the elevator car within the hoistway. This prior art arrangement is described in greater detail below with reference to FIG. 1.

Certain drawbacks with such known position measurement tape arrangements have been appreciated and the elevator position measurement system according to the present disclosure seeks to address these shortcomings.

SUMMARY

According to a first aspect of this disclosure there is provided an elevator system comprising an elevator car, an elongate tension member operably connected to the elevator car and configured to move the elevator car within a hoistway, and an elevator car position measurement system comprising: a pulse generator configured to transmit a pulse along the elongate tension member; a detector unit configured to receive the pulse from the pulse generator after the pulse has been transmitted along a length of the elongate tension member and to record a time at which the pulse is received; wherein one of the pulse generator and the detector unit is arranged to move within the hoistway dependent on a position of the elevator car within the hoistway, such that a length of the elongate tension member along which the pulse is transmitted changes dependent on a position of the elevator car within the hoistway, and wherein the elevator car position measurement system is configured to determine the length of the elongate tension member along which the pulse is transmitted based on the recorded time, and determine the position of the elevator car within the hoistway based on the determined length.

Optionally, the detector unit is positioned at a first end of the elongate tension member.

Optionally, the pulse generator is configured to transmit the pulse along the elongate tension member in a direction towards the detector unit.

Optionally, the pulse generator is mounted on the elevator car and the detector unit is mounted at a fixed position relative to the elongate tension member.

Optionally, the pulse generator is mounted in a fixed position in the hoistway and the detector unit is mounted on the elevator car.

Optionally, the elevator car position measurement system further comprises an initial pulse generator configured to send an initial pulse along the elongate tension member towards the pulse generator to thereby induce a current in the pulse generator.

Optionally, the pulse generator is configured to transmit the pulse along the elongate tension member in a direction towards the detector unit in response to the induced current.

Optionally, the elevator car position measurement system further comprises a terminating connector coupled to the elongate tension member and configured to prevent reflection of the initial pulse back towards the initial pulse generator.

Optionally, the detector unit is configured to record a pulse start time, wherein the pulse start time is a time at which the pulse generator transmits the pulse along the elongate tension member or a time at which the initial pulse generator sends the initial pulse towards the pulse generator.

Optionally, the detector unit further comprises a measurement system control unit configured to determine a time interval between the pulse start time and the time at which the pulse is received by the detector unit.

Optionally, the measurement system control unit is configured to calculate, from the determined time interval, position information indicating the position of the elevator car within the hoistway.

Optionally, the elevator system further comprises an elevator control unit, wherein the measurement system control unit is configured to transmit the position information to the elevator control unit.

Optionally, the elongate tension member comprises a plurality of tension cords surrounded by a sheath, and the pulse generator is configured to send the pulse along one of the plurality of tension cords.

According to a second aspect of this disclosure there is provided an elevator car position measurement system for an elevator system comprising an elongate tension member operably connected to an elevator car and configured to move the elevator car within the hoistway, the elevator car position measurement system comprising: a pulse generator configured for transmitting a pulse along the elongate tension member; a detector unit configured to receive the pulse from the pulse generator after the pulse has been transmitted along a length of the elongate tension member and to record a time at which the pulse is received; wherein one of the pulse generator and the detector unit is configured to be arranged to move within the hoistway dependent on a position of the elevator car within the hoistway such that, in use, a length of the elongate tension member along which the pulse is transmitted changes dependent on a position of the elevator car within the hoistway, and wherein the elevator car position measurement system is configured to calculate the length of the elongate tension member along which the pulse is transmitted based on the recorded time, and determine the position of the elevator car within the hoistway based on the determined length.

According to a third aspect of this disclosure there is provided a method of measuring a position of an elevator car within a hoistway of an elevator system comprising an elongate tension member operably connected to the elevator car and configured to move the elevator car within the hoistway, the method comprising: transmitting a pulse from a first location on an elongate tension member towards a second location on the elongate tension member, wherein a length of the elongate tension member between the first location and the second location changes dependent on a position of the elevator car within the hoistway; recording a time at which the pulse is received at the second location; calculating, based on the recorded time, the length of the elongate tension member along which the pulse is transmitted; and determining, based on the calculated length, a position of the elevator car within the hoistway of the elevator system.

It will be appreciated that any of the optional features described above in relation to the first aspect of the disclosure may equally be combined with the second or third aspects of the disclosure.

In various examples, the elongate tension member comprises a plurality of cords surrounded by a sheath. At least one of the cords, or a pair of the cords, is electrically conductive and configured to transmit the pulse from the pulse generator along the elongate tension member. This electrically conductive cord, or pair of cords, may comprise a metallic material (such as steel) and/or carbon. One or more of the cords are load-bearing cords. In some examples, the plurality of cords comprises load-bearing cords that are electrically conductive. This means that any of the load-bearing cords can be used to transmit an electrical pulse along the elongate tension member. In some other examples, the plurality of cords comprises load-bearing cords that are not electrically conductive (such as polymeric cords) and at least one electrically conductive component that is configured to transmit an electrical pulse along the elongate tension member in parallel with the load-bearing cords. This means there is an electrically conductive component that is dedicated to pulse transmission, which can be independent of the tension member's load-bearing capability.

In some examples, the elongate tension member comprises a plurality of steels cords surrounded by a polymeric sheath, e.g. a coated steel belt.

The examples described herein advantageously provide an elevator car position measurement system that does not require installation of position measurement tape along the complete height of the hoistway, and that utilises the elongate tension member already present in the system. This can reduce material cost and installation time as well as providing space gain in the hoistway due to missing position measurement tape.

Furthermore, measurement of the position of the elevator car using the examples described herein is independent from temperature or expansion or contraction in the building structure, so can offer improved reliability compared to known systems.

DETAILED DESCRIPTION

Some examples of this disclosure will now be described, by way of example only, with reference to the accompanying drawings, in which.

Figure 2:
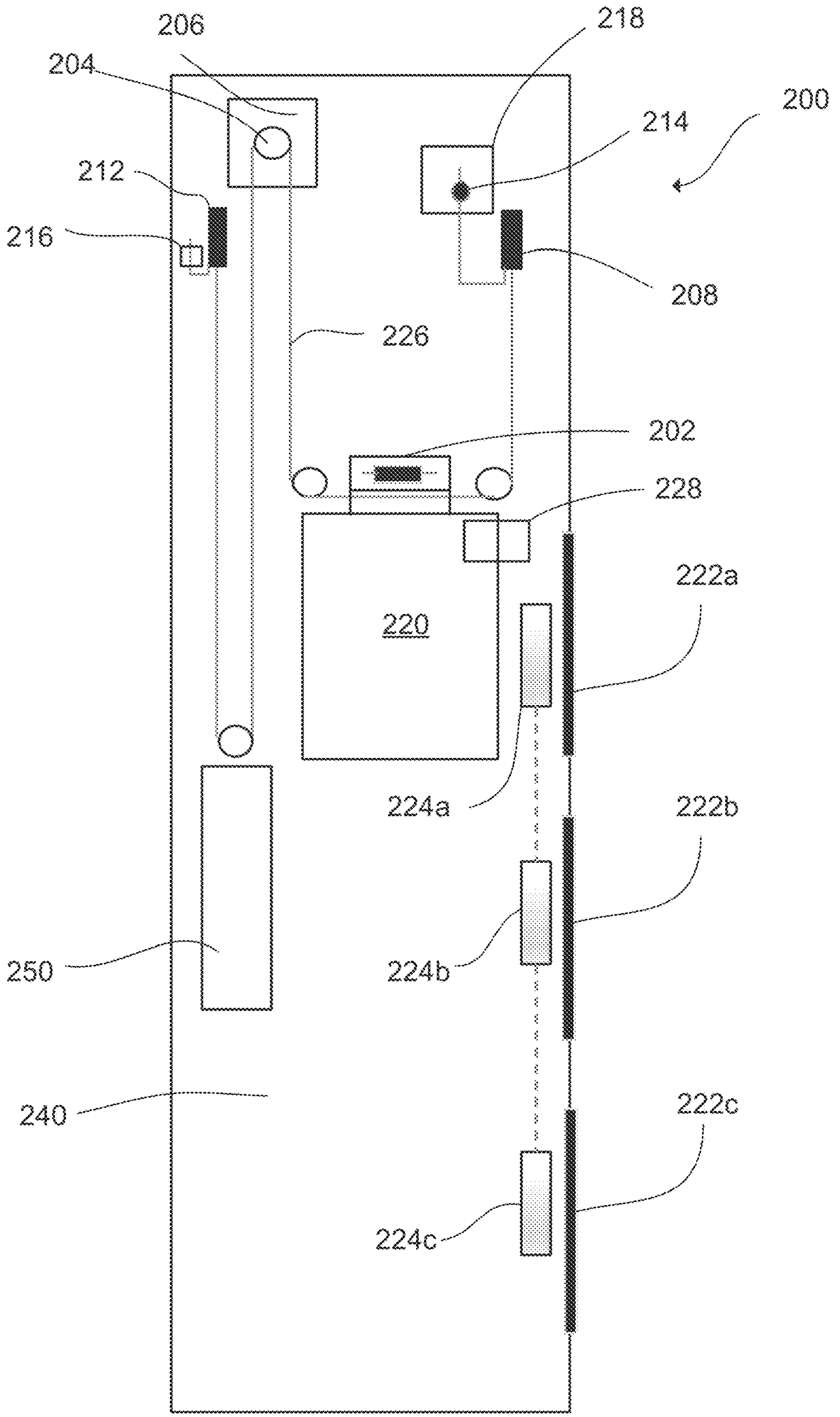
FIG. 2 illustrates an example of an elevator system according to the present disclosure configured with a 2:1 roping system.
Figure 3A:
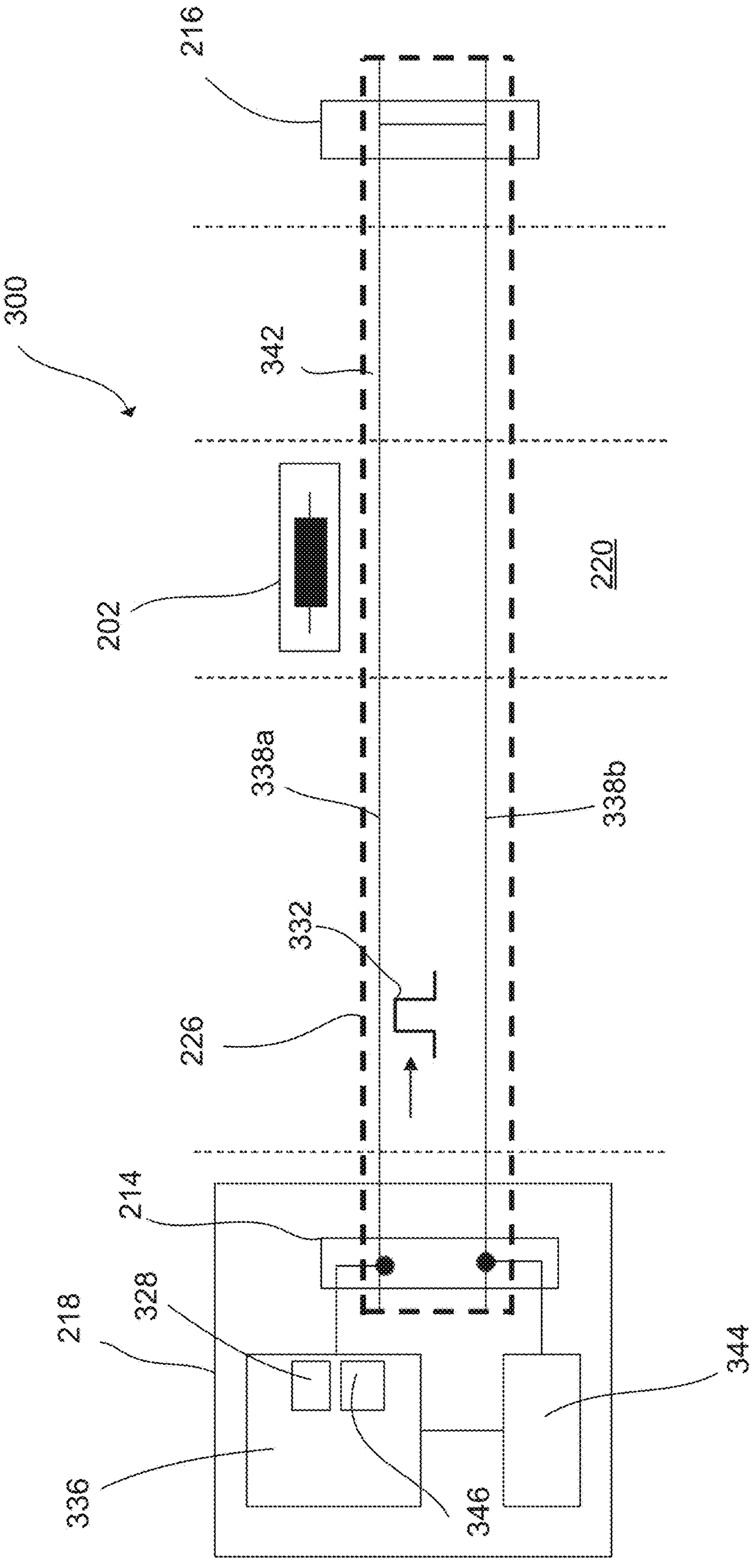
Figure 3B:
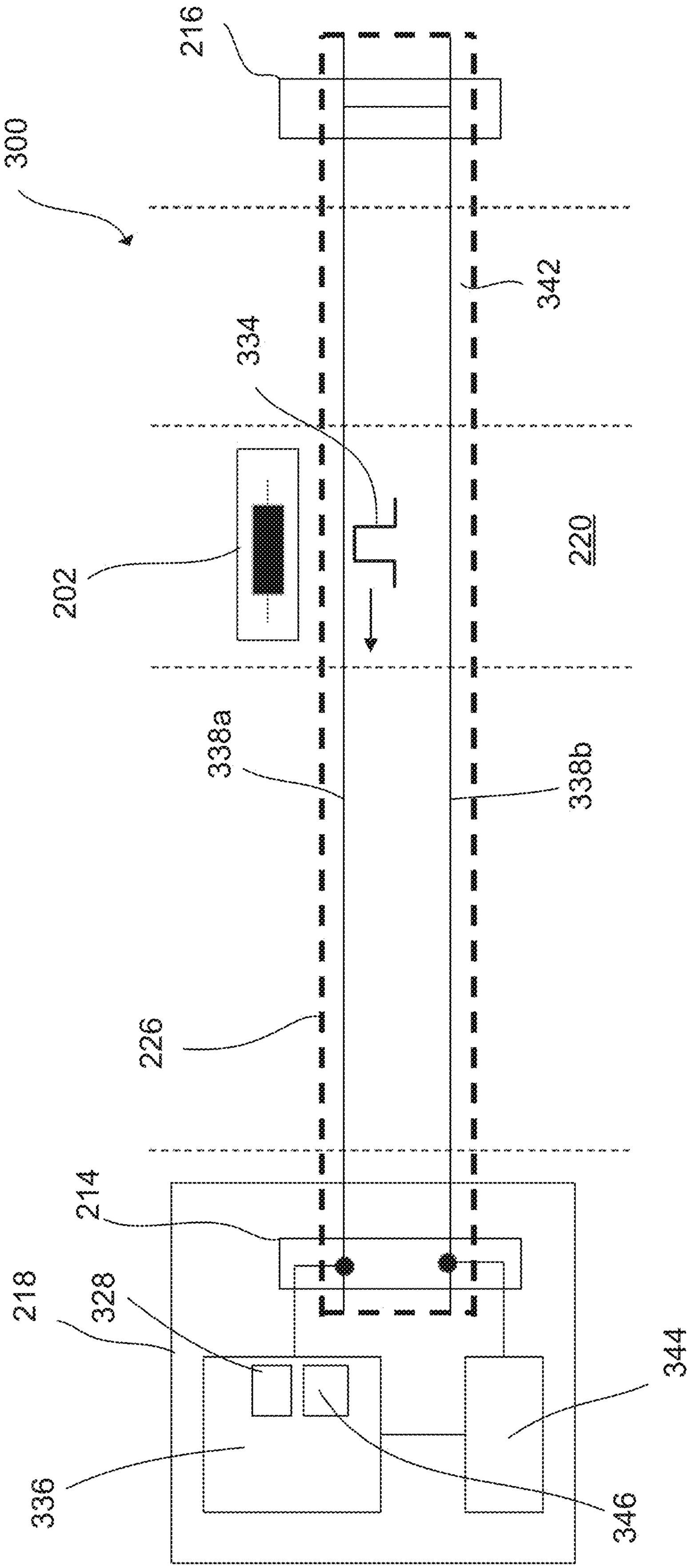
Figure 4:
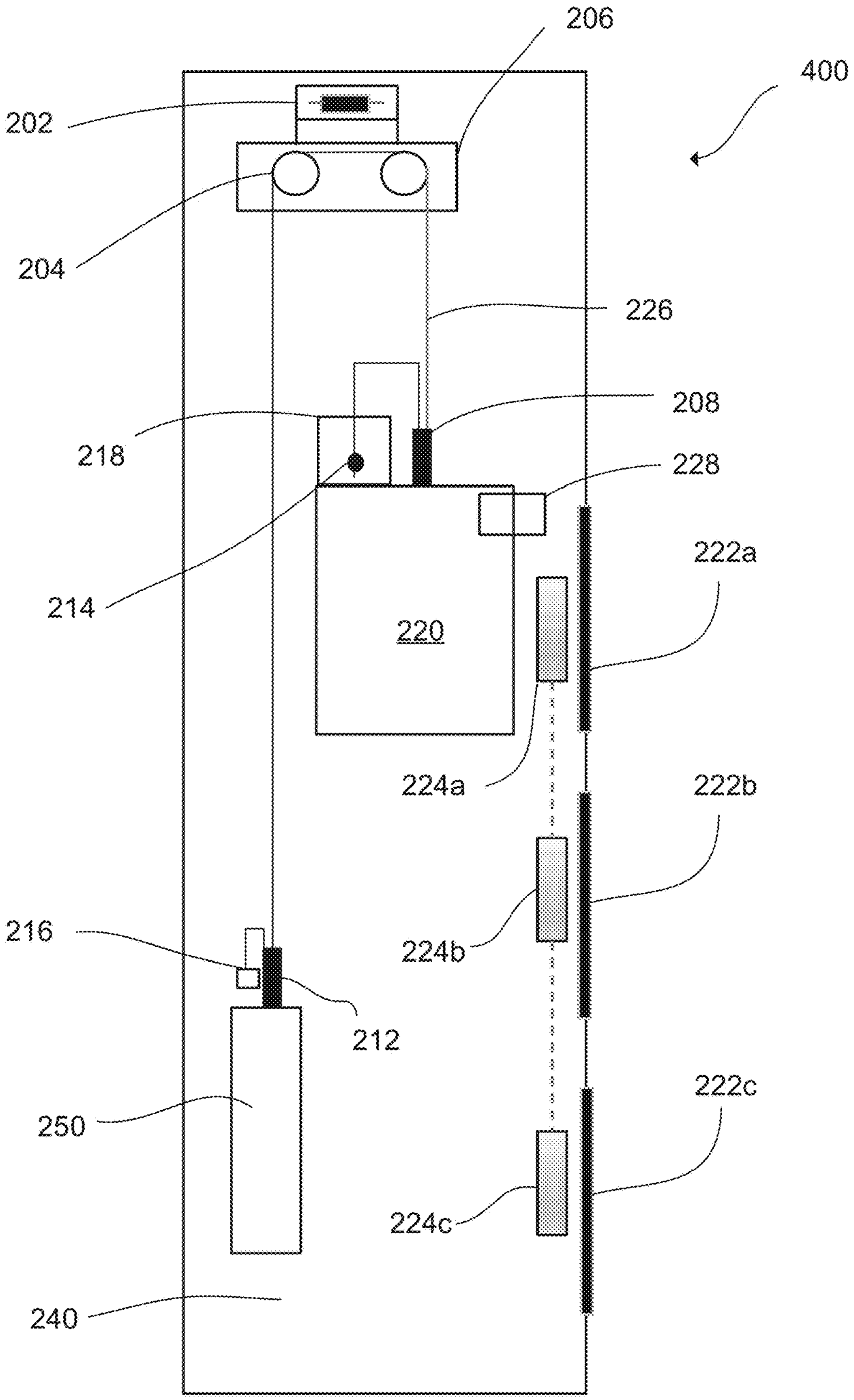
Figure 5A:
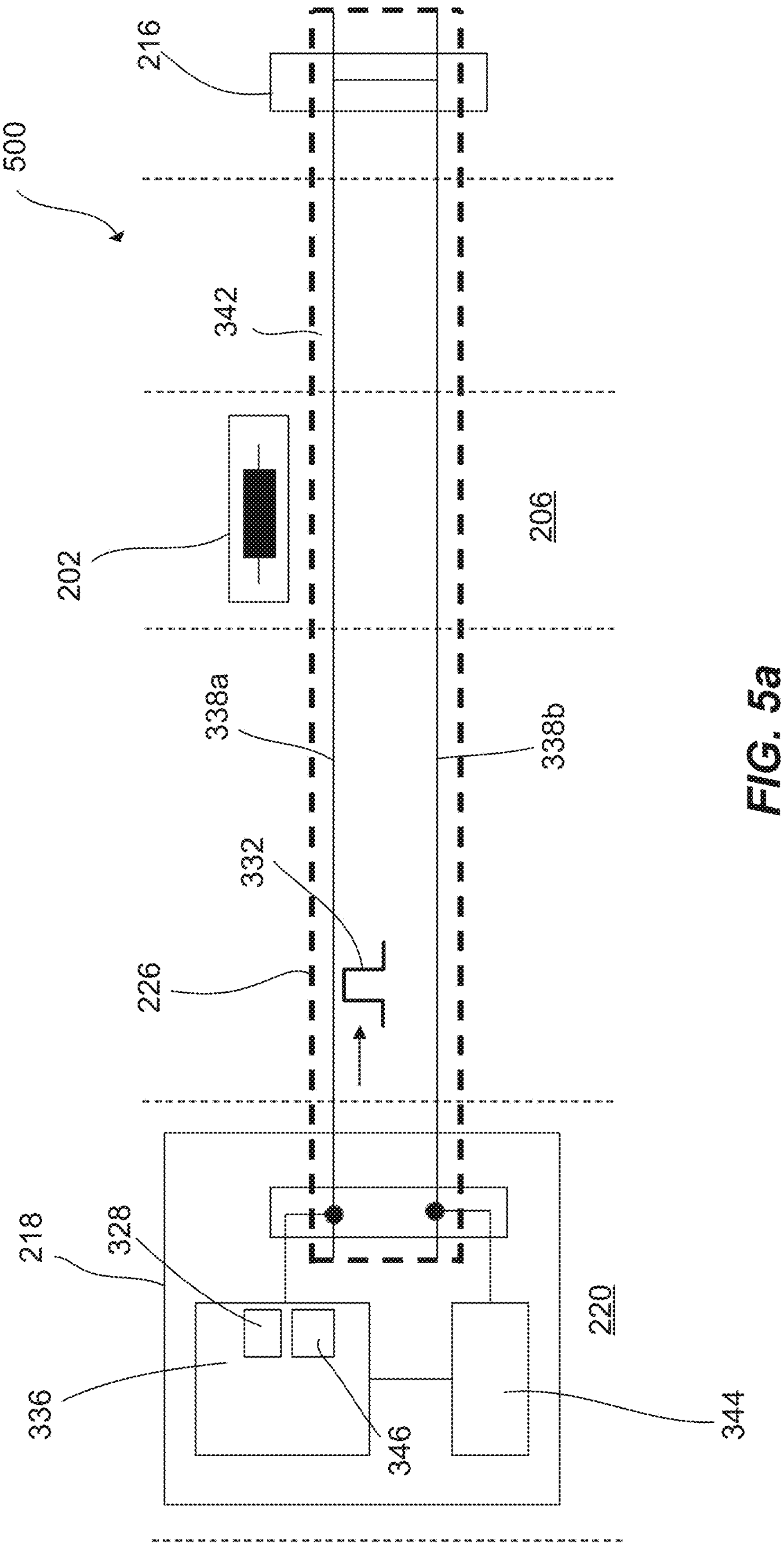
Figure 5B:
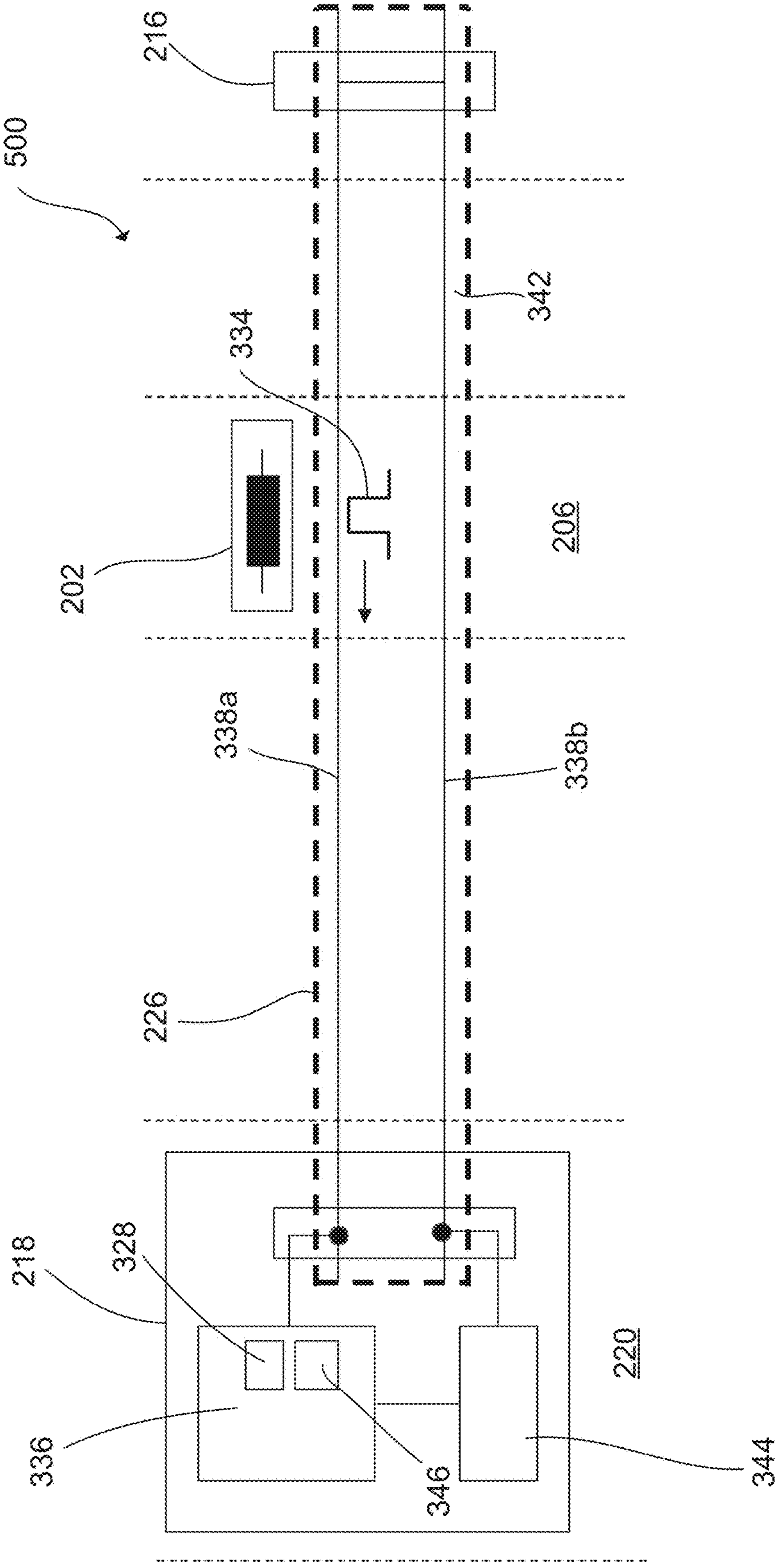
Figure 6:
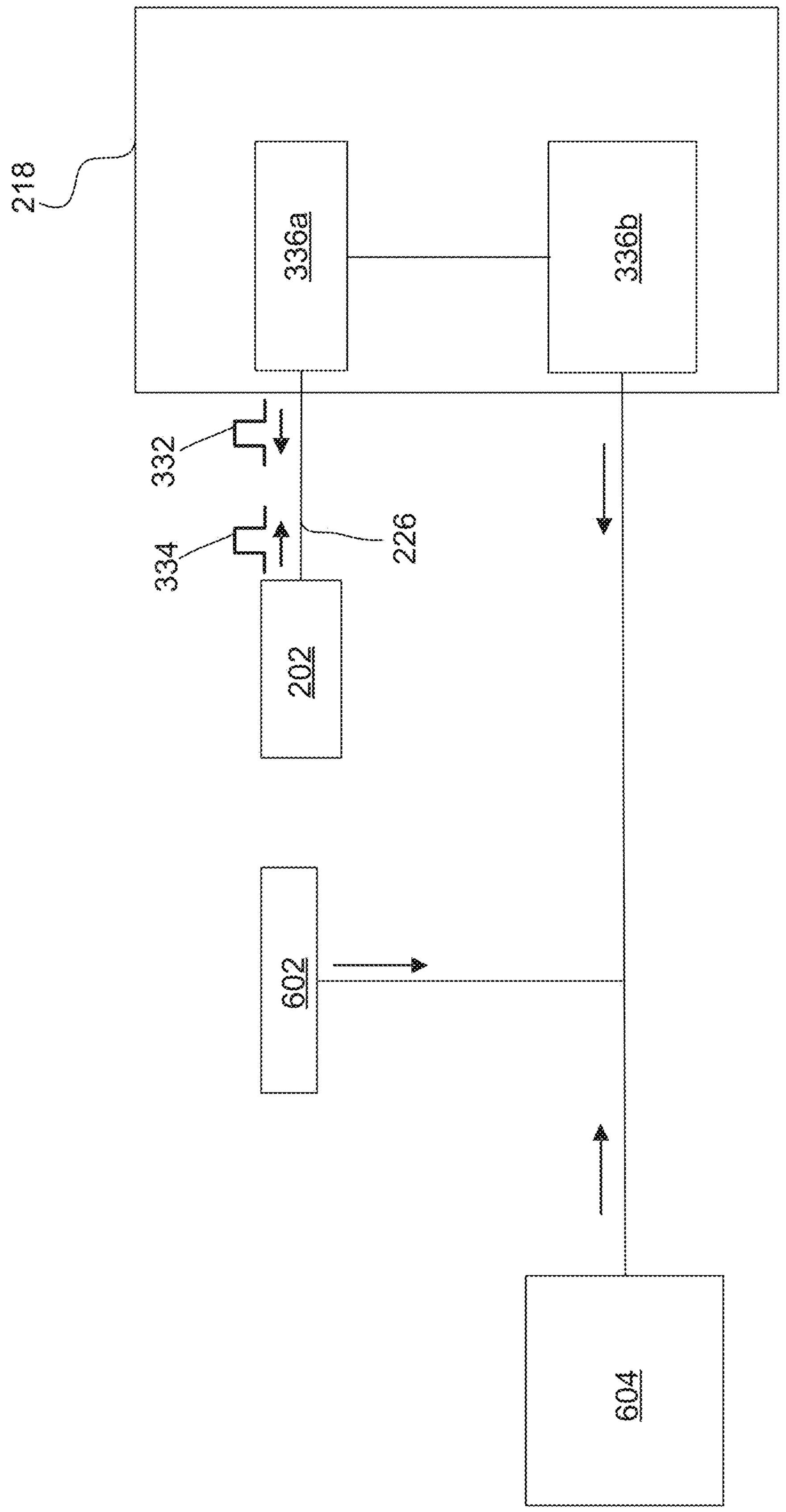
Figure 7:
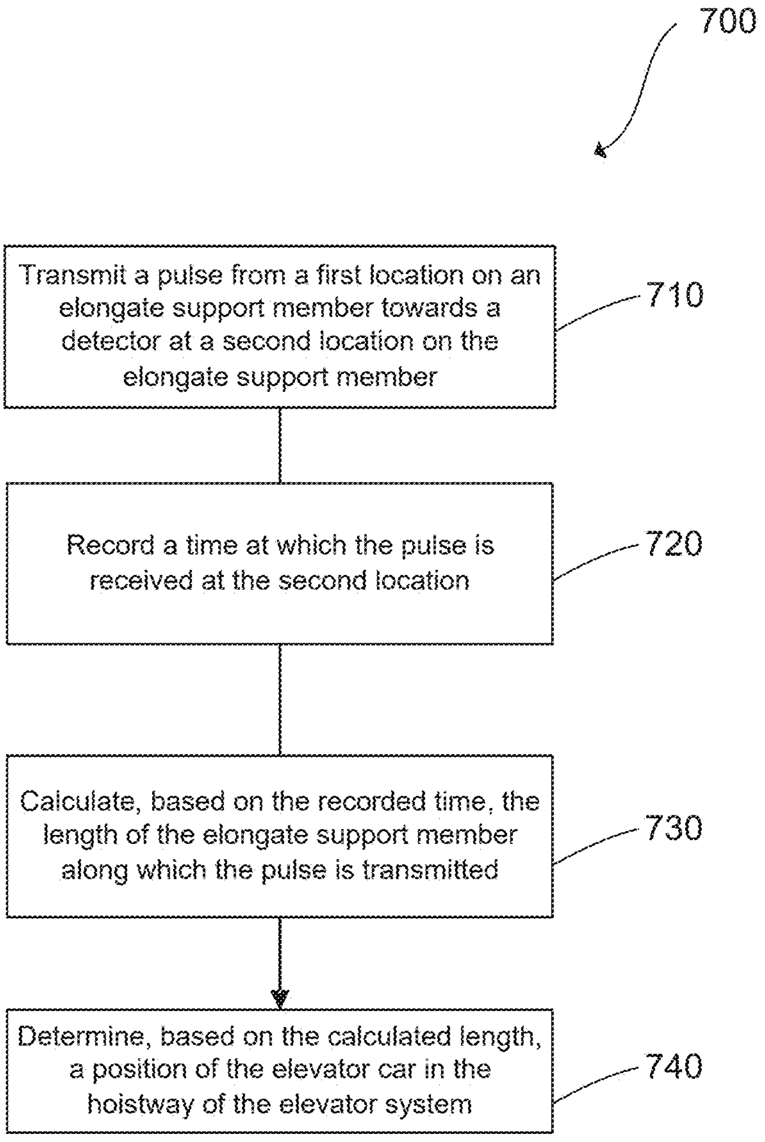
Figure 8:
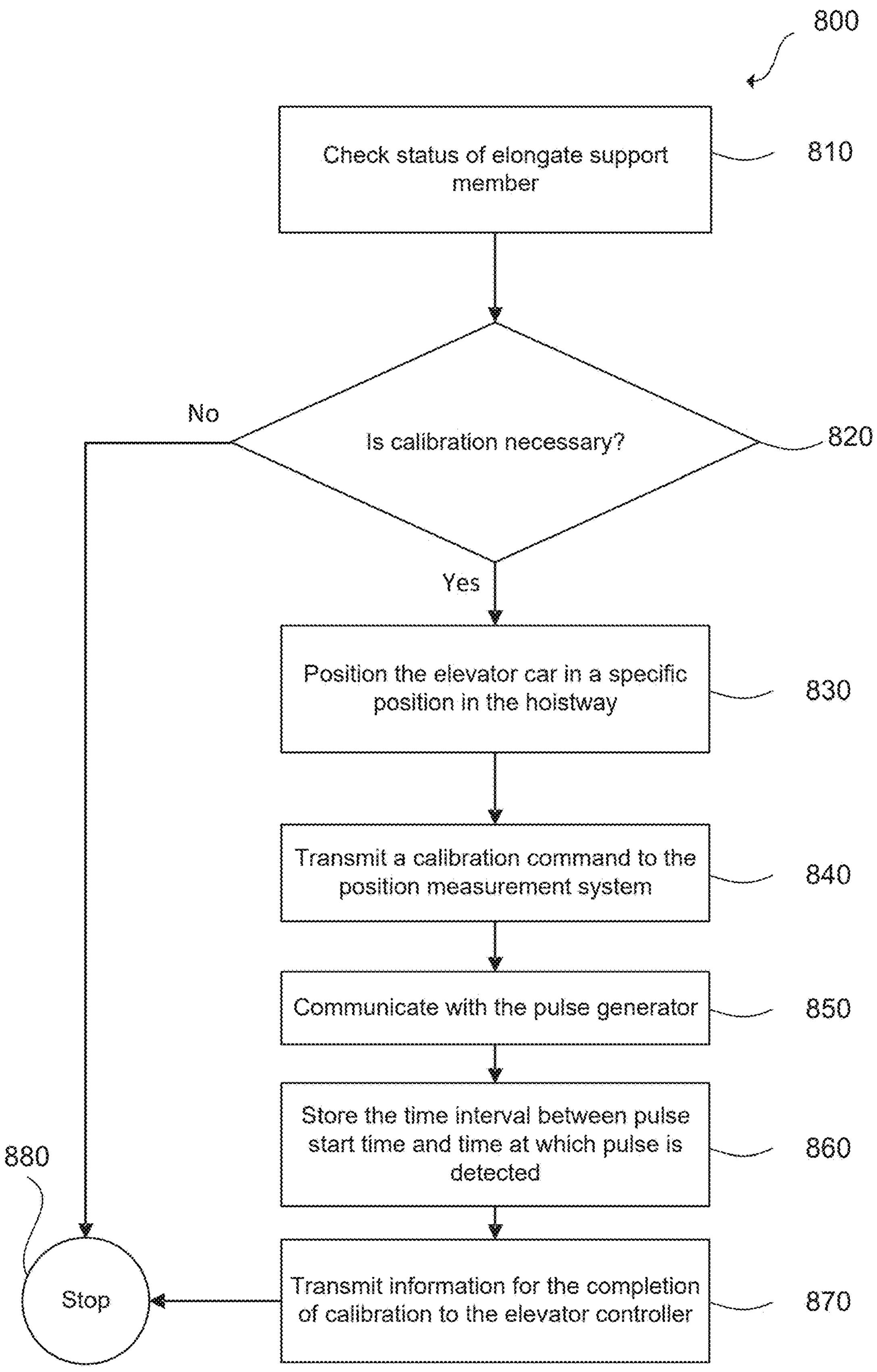

FIGS. 3*a* and 3*b* illustrate a schematic of the elevator position measurement system shown in FIG. 2;

FIG. 4 illustrates an example of an elevator system according to the present disclosure configured with a 1:1 roping system;

FIGS. 5*a* and 5*b* illustrate a schematic of the elevator position measurement system shown in FIG. 2;

FIG. 6 illustrates communication between components of the elevator system;

FIG. 7 illustrates a method of measuring a position of an elevator car within a hoistway; and FIG. 8 illustrates an example calibration process for the position measurement system.

DETAILED DESCRIPTION

Figure 1:
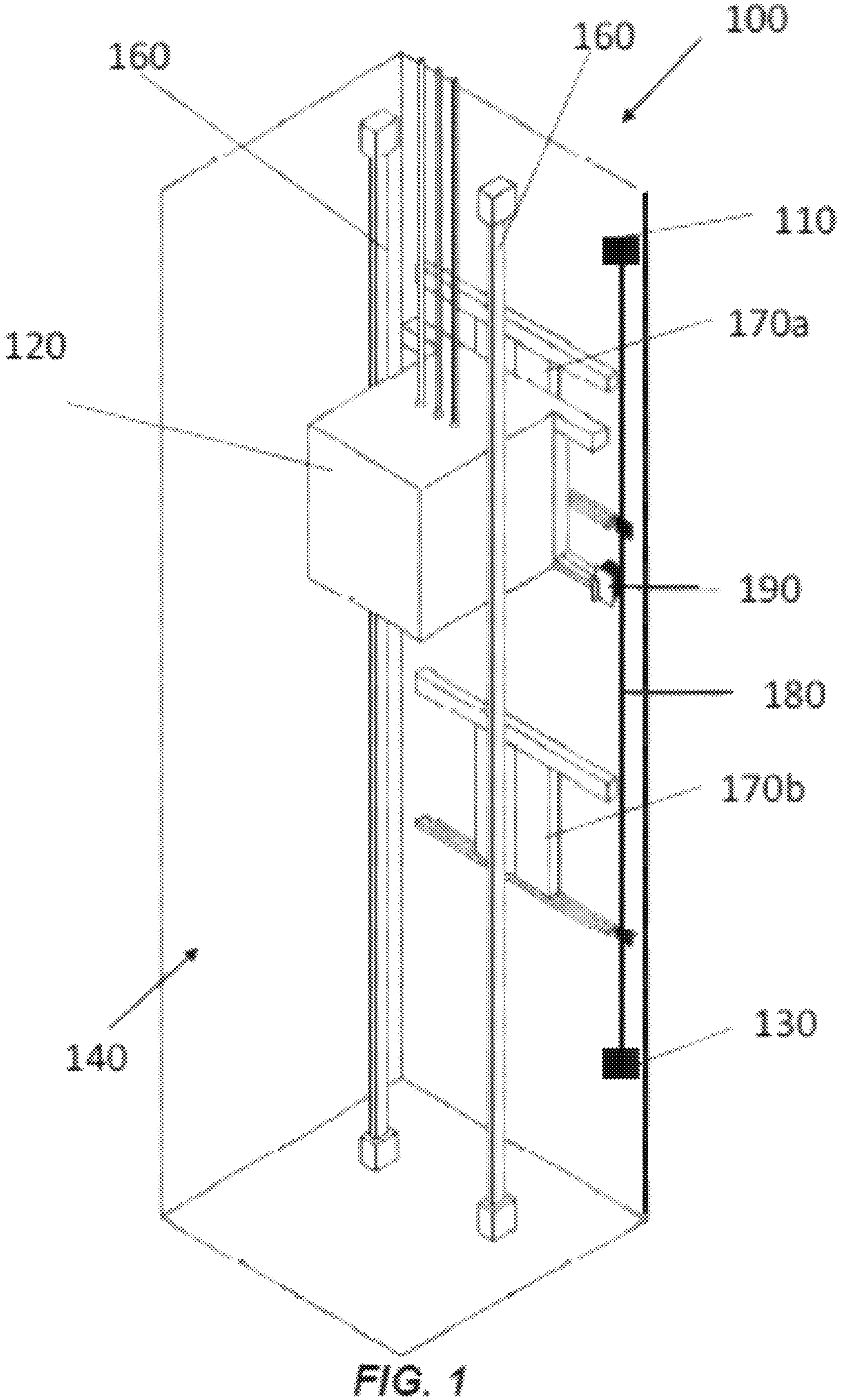
FIG. 1 shows a perspective view of an elevator system including a position measurement tape, as is known in the art.

FIG. 1 shows a perspective view of an elevator system 100 as is known in the art. An elevator car 120 is arranged to move vertically within the hoistway 140, guided along guide rails 160. The hoistway 140 includes a position measurement tape 180. The position measurement tape 180 is fixed to a hoistway wall by an upper fixing device 110, connected to the upper end of the position measurement tape 180, and a lower fixing device 130, connected to the lower end of the position measurement tape 180.

The elevator car 120 moves vertically within the hoistway 140, along the guide rails 160, driven by any suitable drive system as is known in the art, and controlled by an elevator system controller (not shown). A sensor 190 is mounted to the elevator car 120, in a position which is aligned with the position measurement tape 180.

The sensor 190 senses position markings e.g. increments, on the position measurement tape 180 e.g. using a camera. The sensor 190 can either process the collected data itself or pass the data to another component of the elevator system e.g. the elevator system controller, for further processing. This data is processed to determine a position i.e. height, within the hoistway 140. For example, each position marking could be unique and could be looked up in a lookup table (created in an initial calibration process) which includes the corresponding height for each position marking. In this way the position measurement tape 180 is usable by the elevator system 100 to determine the vertical position of the elevator car 120 for any given position within the hoistway 140.

However, such a position reference system requires the position measurement tape 180 to extend along the complete height of the hoistway 140 in order to determine the vertical position of the elevator car 120 at any given height. This can bring additional cost for the tape material, additional installation costs, and requires space in the hoistway.

An elevator system according to the present disclosure, as described herein below with reference to FIGS. 2-8, seeks to address these shortcomings of the prior art elevator system 100.

FIG. 2 shows a side view of an elevator system 200 according to a first example of the present disclosure. The elevator system 200 includes an elevator car 220 and an elongate tension member 226 operably coupled to the elevator car 220 and configured to move the elevator car 220 within a hoistway 240.

In this example, the elevator car 220 is suspended by the elongate tension member 226 in a 2:1 roping configuration as is known in the art. In this configuration, the elongate tension member 226 is configured to move through a traction sheave 204 powered by an elevator drive unit 206 such that the elevator car 220 moves up and down within the hoistway 240. A counterweight 250 is suspended from the elongate tension member 226 on an opposite side of the traction sheave 204 to the elevator car 220. Both the elevator car 220 and the counterweight 250 are suspended by the elongate tension member 226 via at least one pulley. The elongate tension member 226 is fixed at each end with respect to the hoistway with an end terminal 208 at the elevator car 220 side of the elongate tension member 226 and a further end terminal 212 at the counterweight 250 side of the elongate tension member 226.

The elongate tension member 226 may be any belt, cable or rope suitable for passing through the traction sheave 204 and for supporting the weight of the elevator car 220 and the counterweight 250. In this example, the elongate tension member 226 is a coated steel belt.

Referring also to FIGS. 3*a* and 3*b*, the elevator system 200 includes a position measurement system 300 including a pulse generator 202. The pulse generator 202 is configured to transmit a pulse 334 along the elongate tension member 226. In other words, the pulse generator 202 is configured to send a pulse 334 along at least one component of the elongate tension member 226.

Aptly, the pulse generator 202 is configured to transmit an electrical pulse 334 along the elongate tension member 226, and in particular along an electrically conductive component of the elongate tension member 226. For example, the pulse generator 334 is configured to induce an electrical pulse 334 along the elongate tension member 226 by electromagnetic induction.

The position measurement system 300 further includes a detector unit 218. The detector unit 218 is configured to receive the pulse 334 from the pulse generator 202 and record a time at which the pulse 334 is received. The detector unit 218 includes a monitoring connection 214 configured to electrically couple the detector unit 218 to the elongate tension member 226.

The pulse generator 202 and the detector unit 218 are arranged such that a length of the elongate tension member 226 along which the pulse 334 is transmitted changes dependent on a position of the elevator car 220 in the hoistway 240.

In this example, the pulse generator 202 is mounted on the elevator car 220 and the detector unit 218 is mounted at a fixed position relative to the elongate tension member 226. In this example the detector unit 218 is mounted at the end terminal 208 of the elongate tension member 226 closest to the elevator car 220. As such, as the elevator car 220 moves vertically up and down within the hoistway 240, the length of the portion of elongate tension member 226 between the pulse generator 202 and the detector unit 218 changes according to the position of the elevator car 220. The length of the elongate tension member 226 through which the pulse 334 travels from the pulse generator 202 to the detector unit 218 therefore changes according to the position of the elevator car 220 within the hoistway 240.

The position measurement system 300 is configured to determine the length of the elongate tension member 226 along which the pulse 334 is transmitted based on the time the detector unit 218 receives the pulse 334. The position of the elevator car 220 can then be determined according to the determined length of elongate tension member 226 along which the pulse 334 is transmitted between the pulse generator 202 and the detector unit 218.

FIGS. 3*a* and 3*b* illustrate the operation of the position measurement system 300 of FIG. 2 in further detail. The position measurement system 300 further includes an initial pulse generator 328, which in this example is located at the detector unit 218. In this example, the position measurement system 300 includes a position measurement control unit 336, which includes the initial pulse generator 328.

The initial pulse generator 328 is configured to send an initial pulse 332 along the elongate tension member 226 towards the pulse generator 202, which in this example is positioned on the elevator car 220. The initial pulse 332 induces a current in the pulse generator 202. In response to the induced current, the pulse generator 202 is configured to transmit a pulse 334 back towards the detector unit 218 as shown in FIG. 3*b*. In some examples, there may be a time delay between the initial pulse 332 inducing the current in the pulse generator 202 and the pulse generator 202 transmitting the pulse 334 back to the detector unit 218. In this example the pulse generator 202 is an inductive pulse transceiver.

The detector unit 218 may include a pulse detector 346 configured to detect the pulse 334 and a measurement system control unit 336 configured to record the time at which the pulse 334 is received.

In addition to recording the time at which the pulse 334 is received by the detector unit 218, the detector unit 218 is further configured to record a pulse start time. A time interval between the pulse start time and the time at which the pulse 334 is received by the detector unit 218 may then be used to calculate the length of elongate tension member 226 along which the pulse 334 has travelled, i.e. the length of elongate tension member 226 between the pulse generator 202 and the detector unit 218.

In this example the pulse start time is the time at which the initial pulse generator 328 sends the initial pulse 332 towards the pulse generator 202. In other examples, the pulse start time may be the time at which the pulse generator 202 transmits the pulse 334 along the elongate tension member towards the detector unit 218.

The measurement system control unit 336 is further configured to determine a time interval between the pulse start time and the time at which the pulse 334 is received by the detector unit 218.

In this example the detector unit 218 includes the measurement system control unit 336. In some examples, the measurement system control unit 336 may include a time-to-digital converter 336*a* configured to record the pulse start time and the time at which the pulse 334 is received by the pulse detector 346. The time-to-digital converter 336*a* is discussed in more detail below with reference to FIG. 6. The time-to-digital converter 336*a* may include the initial pulse generator 328 and the pulse detector 346. In this way, the pulse detection and the pulse generation may be an integral function of the time-to-digital converter 336*a* such that pulse generation and pulse detection may both be performed by the time-to-digital converter 336*a*.

The measurement system control unit 336 is further configured to calculate, from the determined time interval, position information indicating the position of the elevator car 220 within the hoistway 240. To calculate the position information, the measurement system control unit 336 may first determine the length of the elongate tension member 226 along which the pulse 334 is transmitted based on the determined time interval. The determined length of the elongate tension member 226 along which the pulse 334 is transmitted may then be used to determine the position of the elevator car 220, for example using a predetermined algorithm or a look up table. The predetermined algorithm or look-up table may be determined using a calibration process as described in more detail below with reference to FIG. 7.

As described above, in this example the elongate tension member 226 is a coated steel belt. The coated steel belt includes at least one pair of tension cords 338*a*, 338*b*. The elongate tension member 226 may further include a plurality of tension cords configured for load-bearing. The tension cords 338*a*, 338*b* are aptly electrically conductive such that they can transmit an electrical pulse. For example, the tension cords 338*a*, 338*b* may be steel cables. The tension cords 338*a*, 338*b* are surrounded by a sheath 342.

As shown in FIGS. 3*a* and 3*b*, the monitoring connection 214 is configured to couple to each of the tension cords 338*a*, 338*b*. The first tension cord 338*a* is coupled to the initial pulse generator 328 and the measurement system control unit 336 including the pulse detector 346. The second tension cord 338*b* is coupled to a terminating connector 344. The tension cords 338*a*, 338*b*, are electrically coupled via a shortening connection 216 at or near the end terminal 212 adjacent the counterweight 250. The initial pulse generator 328 and the pulse generator 202 are configured to send the initial pulse 332 and the pulse 334 along a first tension cord 338*a* of the pair of tension cords 338*a*, 338*b*.

To help prevent reflection of the initial pulse 332 back towards the initial pulse generator 328, the terminating connector 344 is coupled to the second tension cord 338*b* and is configured to have an impedance substantially equal to the characteristic impedance of the elongate tension member 226.

The initial pulse generator 328 and the pulse generator 202 may be configured to generate any pulse that is suitable for travelling along the tension cords 338*a*, 338*b*. In this example, the initial pulse generator 328 and the pulse generator 202 are configured to generate a voltage pulse with a square waveform, but it will be appreciated that other waveforms would also be suitable, for example a sinusoidal, triangular or saw tooth waveform may also be suitable.

Referring back to FIG. 2, the elevator system 200 may further include a secondary elevator car position reference system. The secondary elevator car position reference system includes position measurement tape 224*a-c* located at each door zone 222*a-c* in the hoistway 240. A sensor 228 is mounted to the elevator car 220, in a position which aligns with the position measurement tape 224*a-c*. The sensor 228 senses position markings e.g. increments, on the position measurement tape 224*a-c*, e.g. using a camera.

The sensor 228 can either process the collected data itself or pass the data to another component of the elevator system e.g. an elevator system control unit, for further processing.

The secondary elevator car position reference system can be utilized in combination with the position measurement system 300 to provide high resolution position measurements of the elevator car 220 at each door zone 222*a-c* within the hoistway. The position measurement system 300 of the present disclosure enables position measurement of the elevator car through the full height of the hoistway 240 without the need for the higher resolution position measurement tape 224*a-c* to be positioned along the full height of the hoistway 240. Thus, shorter lengths of position measurement tape 224*a-c* may be utilised, thereby reducing material and installation costs. Furthermore, the space required in the hoistway 240 is reduced since the position measurement tape 224*a-c* is only provided at the door zones 222*a-c*.

FIG. 4 shows a side view of an elevator system 400 according to a second example of the present disclosure. The elevator system 400 includes an elevator car 220 and an elongate tension member 226 operably coupled to the elevator car 220 and configured to move the elevator car 220 within a hoistway 240.

In this example, the elevator car 220 is suspended from a first end of the elongate tension member 226 in a 1:1 roping configuration as is known in the art. In this configuration, the elongate tension member 226 is configured to move through a traction sheave 204 powered by an elevator drive unit 206 such that the elevator car 220 moves up and down within the hoistway 240. A counterweight 250 is suspended from a second end of the elongate tension member 226 and on an opposite side of the traction sheave 204 to the elevator car 220.

The elevator system 400 includes many of the same components as the elevator system 200 described above in relation to FIGS. 2 and 3, which will not be described again in detail.

However, in this example the pulse generator 202 is mounted at a fixed position in the hoistway 240 rather than at the elevator car 220. In this example, the pulse generator 202 is mounted at the traction sheave 204. The detector unit 218 is mounted on the elevator car 220 such that it is in a fixed position relative to the end terminal 208 of the elongate tension member 226. In this example, the detector unit 218 is positioned at the first end of the elongate tension member 226, which in this case is at the elevator car 220. In this way, as the elevator car 220 moves vertically up and down within the hoistway 240, the length of the portion of elongate tension member 226 between the pulse generator 202 and the detector unit 218 changes according to the position of the elevator car 220. The length of the elongate tension member 226 through which the pulse travels from the pulse generator 202 to the detector unit 218 therefore changes according to the position of the elevator car 220 within the hoistway 240.

FIGS. 5*a* and 5*b* illustrate the operation of the position measurement system 500 of FIG. 4 in further detail. It will be appreciated that the operation of the system of FIGS. 5*a* and 5*b* is substantially identical to that described with reference to FIGS. 3*a* and 3*b*, except for the positioning of the detector unit 218 and the pulse generator 202 within the elevator system 400 as described above with reference to FIG. 4.

FIG. 6 illustrates communication between components of the position measurement system and the elevator system. The position measurement system is substantially the same as in the examples described above, and includes a pulse generator 202 and a detector unit 218 including a measurement system control unit 336. In this example, the measurement system control unit 336 includes a time-to-digital converter 336*a* and a microcontroller 336*b*.

The elevator system further includes a wear detection device 602. The wear detection device 602 may be configured to monitor the physical condition of the elongate tension member 226. For example, the wear detection device 602 may be configured to monitor the condition of the elongate tension member 226 by monitoring the electrical resistance of one or more tension cords 338*a*, 338*b* of the elongate tension member 226.

The elevator system further includes an elevator control unit 604. The elevator control unit 604 is configured to communicate with the detector unit 218 and the wear detection device 602. For example, the elevator control unit 604 may be configured to transmit position measurement and/or a calibration command and parameters to the detector unit 218. The elevator control unit 604 may also be configured to read position information from the detector unit 218. The elevator control unit 604 may be further configured to communicate with the wear detection device 602 and read wear status of the elongate tension member 226 from the wear detection device 602.

The pulse generator 202 may be an inductive pulse transceiver and operates as described above in relation to FIGS. 2 to 5. The pulse generator 202 is configured to receive a pulse 332 from the detector unit 218 and, in response, send a pulse 334 to the detector unit 218 along the elongate tension member 226.

In this example, the measurement system control unit 336 includes the time-to-digital converter 336*a* and the microcontroller 336*b*. The time-to-digital converter 336*a* is configured to send the pulse 332 pulse to the pulse generator 202. For example, the time-to-digital converter 336*a* may include an initial pulse generator configured to send the pulse 332 to the pulse generator 202. The time-to-digital converter 336*a* is also configured to receive the pulse 334 from the pulse generator 202. For example, the time-to-digital converter 336*a* may include a pulse detector to detect the pulse 334 from the pulse generator 202. The time-to-digital converter 336*a* may further be configured to record a first timestamp relating to the time at which the time-to-digital converter 336*a* sends the initial pulse 332 to the pulse generator 202 and a second timestamp relating to the time at which the time-to-digital converter 336*a* receives the pulse 334 from the pulse generator 202. The first and second timestamps may be stored in a memory in the time-to-digital converter 336*a*.

The microcontroller 336*b* may be configured to manage the time-to-digital converter 336*a*. This may include reading the first and second timestamps from the time-to-digital converter 336*a* and converting the timestamps into position information relating to the position of the elevator car 220 in the hoistway 240. The microcontroller 336*b* may be configured to transmit the position information to the elevator control unit 604. The microcontroller may be further configured to store calibration reference information, as will be described further below with reference to FIG. 8.

In this example the wear detection device 602 is provided separately to the detector unit 218. However, it will be appreciated that in some examples the wear detection device 602 may be provided integrally together with the detector unit 218. In this configuration both the wear detection device 602 and the position measurement system may advantageously couple to the pair of tension cords 338*a*, 338*b* of the elongate tension member 226 at the same location. As such, it is possible that the position measurement system of the present disclosure may be retrofitted to an existing elevator system, which includes a wear detection device 602.

For example, when retrofitting to an existing installation, the detector unit 218 may be provided separately to the wear detection device 602. In this case, the detector unit 218 and the wear detection device 602 may each couple to the elongate tension member 226 via the same monitoring connection 214.

The wear detection device 602 typically includes a microprocessor communicating with the elevator control unit 604. As such, the position measurement system may optionally share the same microprocessor and communication components with the wear detection device 602. In other words, the detector unit 218 may be integrated with the wear detection device 602 and both the detector unit 218 and the wear detection device may couple to the elongate tension member 226 via the same monitoring connection 214. This configuration may be advantageous for new installations to help reduce component parts, and reduce installation time and cost.

FIG. 7 illustrates a method 700 of measuring a position of an elevator car 220 within a hoistway 240 of an elevator system including an elongate tension member 226 operably connected to the elevator car 220 and configured to move the elevator car 220 within the hoistway 240.

At a first step 710 the method includes transmitting a pulse 334 from a first location on an elongate tension member 226 towards a detector at a second location on the elongate tension member 226. The first location and the second location may be any suitable location in the hoistway 240, so long as they are positioned such that a length of the elongate tension member 226 between the first location and the second location changes dependent on a position of the elevator car 220 in the hoistway 240.

For example, as described above in an elevator system configured with a 2:1 roping configuration, the first location may be on the elevator car 220, and the second location may be at an end terminal 208 of the elongate tension member 226 closest to the elevator car 220. In an elevator system configured with a 1:1 roping configuration, the first location may be at a fixed position in the hoistway 240, for example at the traction sheave 204, and the second location may be on the elevator car 220.

A first method step 710 may include recording a pulse start time. As described above, the pulse start time may be the time at which an initial pulse generator 328 sends the initial pulse 332 towards the pulse generator 202 at the first location. In other examples, the pulse start time may be the time at which the pulse generator 202 at the first location transmits the pulse 334 along the elongate tension member 226 towards the detector unit 218 at the second location.

A second method step 720 includes recording a time at which the pulse is received at the second location. This may include recording the time at which the pulse 334 is received by the detector unit 218 at the second location.

At step 730 the method 700 includes calculating, based on the recorded time, the length of the elongate tension member 226 along which the pulse is transmitted. The length of the elongate tension member 226 along which the pulse is transmitted may correspond to the length of elongate tension member between the first and second location. To calculate the length of tension member between the first and second location the method may include calculating a time interval between a pulse start time and the time at which the pulse 334 is received by the detector unit 218 at the second location. It will be appreciated that the time interval increases as the length of the elongate tension member 226 along which the pulse is transmitted increases. In practice, a time delay is present between the time at which the initial pulse 332 arrives at the pulse generator 202 and the time at which the pulse generator 202 sends the pulse 334 back to the detector 346. As such, a time value equal to the time interval minus the time delay is proportional to the length of the elongate tension member 226 along which the pulse is transmitted.

At step 740 the method 700 includes determining, based on the calculated length, a position of the elevator car 220 in the hoistway 240 of the elevator system. This step may include referring to calibration information to determine the absolute position of the elevator car 220 in the hoistway 240. For example, the calibration information may include an algorithm or look-up table to convert the calculated length to position information indicating the position of the elevator car 220 in the hoistway 240. As described above, the position information may be communicated to an elevator control unit 604.

FIG. 8 illustrates an example calibration process 800 for calibrating the position measurement system of the present disclosure. The calibration process 800 may be initially carried out at installation. In addition, the calibration process 800 may be repeated throughout the lifetime of the elevator system 200, 400 in response to changes in the properties of the elongate tension member 226 due to natural wear, for example.

At step 810 the status of the elongate tension member 226 is checked. The status may be checked using a wear detection device 602. The wear status of the elongate tension member 226 may be communicated to and read by the elevator control unit 604.

At step 820 the elevator control unit 604 may determine whether calibration of the position measurement system is necessary. For example, if the elevator control unit 604 determines that the wear status of the elongate tension member has changed by at least a predetermined amount since the last calibration, the elevator control unit 604 will determine that calibration is necessary.

At step 830 the calibration process 800 includes positioning the elevator car 220 in a specific position in the hoistway 240. For example, the elevator car 220 may be positioned in the region of a door zone 222*a-c*, with the absolute position being measured by a secondary position reference system including position measurement tape 224*a-c* as described above with reference to FIG. 2.

At step 840 the elevator control unit 604 may transmit a calibration command to the position measurement system control unit 336.

At step 850 the position measurement control unit 336 may communicate with the pulse generator 202 to send a pulse to the detector unit 218. The position measurement control unit may record the pulse start time and the time at which the pulse 334 is received by the detector unit 218.

At step 860 the position measurement control unit 336 may store the time interval between the pulse start time and the time at which the pulse is received by the detector unit as reference for the subsequent position measurements.

Steps 830 to 860 may be repeated as necessary to store multiple reference points. The position measurement control unit 336 may determine an algorithm or generate a lookup table based on the reference points to convert time interval information to elevator car position information.

At step 870 the position measurement control unit 336 may transmit information indicating completion of calibration process to the elevator controller 604.

It will be appreciated that various modifications may be made to the examples described herein. For example, although the position measurement system is described above in the context of an elevator system with a 2:1 roping or 1:1 roping configuration, it will be appreciated that the position measurement system may also be employed in an elevator system with a different roping configuration by appropriately positioning the pulse generator and the detector unit such that the length of the elongate tension member in between changes according to the position of the elevator car in the hoistway.

It will also be appreciated that in some examples the initial pulse generator described in the examples above may be omitted and the pulse generator may transmit the pulse directly to the detector unit without the need for the initial pulse. For example, a voltage may be applied directly to the pulse generator to generate and transmit a pulse along the elongate tension member towards the detector unit. In this instance, the pulse start time would be recorded as the time at which the pulse generator sends the pulse towards the detector unit.

Although the pulse generator and the detector unit are shown in specific positions in the examples described above, in other examples the pulse generator and the detector unit may be provided at different positions. These different positions may be any position in which one of the pulse generator and the detector moves dependent on the position of the elevator car within the hoistway such that the length of the elongate tension member along which the pulse is transmitted from the pulse generator to the detector unit changes dependent on the position of the elevator car within the hoistway.

For example, one of the pulse generator and detector unit may be located on either the elevator car or the counterweight, or at a location on the elongate tension member near the elevator car or the counterweight such that they move dependent on movement of the elevator car. The other of the pulse generator and the detector unit may be located at a fixed position within the hoistway such that the length of elongate tension member between the pulse generator and the detector unit changes dependent on the position of the elevator car within the hoistway.

The elongate tension member 226 described herein may aptly be an elongate suspension member configured for suspending the elevator car within the hoistway. The suspension member is configured for supporting the weight of the elevator car and counterweight within the hoistway. For example, the elongate tension member may be any suitable suspension member including a suspension belt, rope, or cable.

The elongate tension member 226 in any of the examples described herein may include at least one electrically conductive component. The pulse generator 202 may be configured to transmit the pulse, which may be an electrical pulse, along the electrically conductive component. Similarly, the initial pulse generator 328 may be configured to transmit the initial pulse, which may be an electrical pulse, along the electrically conductive component.

The electrically conductive component may aptly be the tension cords 338*a*, 338*b* in the examples described above. That is the tension cords 338*a*, 338*b* are aptly electrically conductive.

In other examples the elongate tension member 226 may include an electrically conductive component provided specifically for transmitting the pulse along the elongate tension member 226. For example, an electrically conductive wire may be embedded within a belt or rope forming the elongate tension member 226.

It will be appreciated by those skilled in the art that the disclosure has been illustrated by describing one or more examples thereof, but is not limited to these examples; many variations and modifications are possible, within the scope of the accompanying claims.

What is claimed is:

1. An elevator system (200, 400) comprising an elevator car (220), an elongate tension member (226) operably connected to the elevator car (220) and configured to move the elevator car (220) within a hoistway (240), and an elevator car position measurement system (300, 500) comprising:

a pulse generator (202) configured to transmit a pulse (334) along the elongate tension member (226) from a first location on the elongate tension member (226) towards a second location on the elongate tension member (226);

a detector unit (218) configured to receive the pulse (334) from the pulse generator (202) after the pulse (334) has been transmitted along a length of the elongate tension member (226) and to record a time at which the pulse (334) is received;

wherein (i) the pulse generator (202) is arranged to move within the hoistway (240) dependent on a position of the elevator car (220) within the hoistway (240) or (ii) the detector unit (218) is arranged to move within the hoistway (240) dependent on the position of the elevator car (220) within the hoistway (240), wherein the length of the elongate tension member (226) between the pulse generator (202) and the detector unit (218) along which the pulse (334) is transmitted changes dependent on the position of the elevator car (220) within the hoistway (240), and wherein the elevator car position measurement system (300, 500) is configured to determine the length of the elongate tension member (226) along which the pulse (334) is transmitted based on the recorded time, and determine the position of the elevator car (220) within the hoistway (240) based on the determined length.

2. The elevator system (200, 400) according to claim 1, wherein the detector unit (218) is positioned at a first end (208) of the elongate tension member (226).

3. The elevator system (200, 400) according to claim 1, wherein the pulse generator (202) is configured to transmit the pulse (334) along the elongate tension member (226) in a direction towards the detector unit (218).

4. The elevator system (200, 400) according to claim 1, wherein the pulse generator (202) is mounted on the elevator car (220) and the detector unit (218) is mounted at a fixed position relative to the elongate tension member (226).

5. The elevator system (200, 400) according to claim 1, wherein the pulse generator (202) is mounted in a fixed position in the hoistway (240) and the detector unit (218) is mounted on the elevator car (220).

6. The elevator system (200, 400) according to claim 1, wherein the elevator car position measurement system (300, 500) further comprises an initial pulse generator (328) configured to send an initial pulse (332) along the elongate tension member (226) towards the pulse generator (202) to thereby induce a current in the pulse generator (202).

7. The elevator system (200, 400) according to claim 6, wherein the pulse generator (202) is configured to transmit the pulse (334) along the elongate tension member (226) in a direction towards the detector unit (218) in response to the induced current.

8. The elevator system (200, 400) according to claim 6, wherein the elevator car position measurement system (300, 500) further comprises a terminating connector (334) coupled to the elongate tension member (226) and configured to prevent reflection of the initial pulse (332) back towards the initial pulse generator (328).

9. The elevator system (200, 400) according to claim 1, wherein the detector unit (218) is configured to record a pulse start time, wherein the pulse start time is a time at which the pulse generator (202) transmits the pulse (334) along the elongate tension member (226) or a time at which the initial pulse generator (328) sends the initial pulse (332) towards the pulse generator (202).

10. The elevator system (200, 400) according to claim 9, wherein the detector unit (218) further comprises a measurement system control unit (336) configured to determine a time interval between the pulse start time and the time at which the pulse (334) is received by the detector unit (218).

11. The elevator system (200, 400) according to claim 10, wherein the measurement system control unit (336) is configured to calculate, from the determined time interval, position information indicating the position of the elevator car (220) within the hoistway (240).

12. The elevator system (200, 400) according to claim 11, further comprising an elevator control unit (604), wherein the measurement system control unit (336) is configured to transmit the position information to the elevator control unit (604).

13. The elevator system (200, 400) according to claim 1, wherein the elongate tension member (226) comprises a plurality of tension cords (338*a*, 338*b*) surrounded by a sheath (342), and wherein the pulse generator (202) is configured to send the pulse (334) along one of the plurality of tension cords (338*a*, 338*b*).

14. An elevator car position measurement system (300, 500) for an elevator system (200, 400) comprising an elongate tension member (226) operably connected to an elevator car (220) and configured to move the elevator car (220) within the hoistway (240), the elevator car position measurement system (300, 500) comprising:

a pulse generator (202) configured for transmitting a pulse (334) along the elongate tension member (226) from a first location on the elongate tension member (226) towards a second location on the elongate tension member (226);

a detector unit (218) configured to receive the pulse (334) from the pulse generator (202) after the pulse (334) has been transmitted along a length of the elongate tension member (226) and to record a time at which the pulse (334) is received;

wherein (i) the pulse generator (202) is arranged to move within the hoistway (240) dependent on a position of the elevator car (220) within the hoistway (240) or (ii) the detector unit (218) is arranged to move within the hoistway (240) dependent on the position of the elevator car (220) within the hoistway (240), wherein the length of the elongate tension member (226) between the pulse generator (202) and the detector unit (218) along which the pulse (334) is transmitted changes dependent on the position of the elevator car (220) within the hoistway (240), and wherein the elevator car position measurement system (300, 500) is configured to calculate the length of the elongate tension member (226) along which the pulse (334) is transmitted based on the recorded time, and determine the position of the elevator car (220) within the hoistway (240) based on the determined length.

* * * * *